United States Patent
Brunermer et al.

(10) Patent No.: US 10,061,284 B2
(45) Date of Patent: Aug. 28, 2018

(54) THREE-DIMENSIONAL PRINTING USING FAST STL FILE CONVERSION

(71) Applicant: The ExOne Company, North Huntingdon, PA (US)

(72) Inventors: Daniel T. Brunermer, Leechburg, PA (US); Patrick Stack, North Huntingdon, PA (US); Lawrence Joseph Voss, Pittsburgh, PA (US)

(73) Assignee: The ExOne Company, North Huntingdon, PA (US)

( * ) Notice: Subject to any disclaimer, the term of this patent is extended or adjusted under 35 U.S.C. 154(b) by 129 days.

(21) Appl. No.: 15/126,724

(22) PCT Filed: Mar. 19, 2015

(86) PCT No.: PCT/US2015/021496
§ 371 (c)(1),
(2) Date: Sep. 16, 2016

(87) PCT Pub. No.: WO2015/143174
PCT Pub. Date: Sep. 24, 2015

(65) Prior Publication Data
US 2017/0087771 A1    Mar. 30, 2017

Related U.S. Application Data

(60) Provisional application No. 61/968,148, filed on Mar. 20, 2014.

(51) Int. Cl.
*G05B 19/042*    (2006.01)
*G06T 19/00*    (2011.01)
(Continued)

(52) U.S. Cl.
CPC .......... *G05B 19/042* (2013.01); *B29C 64/165* (2017.08); *B29C 64/386* (2017.08);
(Continued)

(58) Field of Classification Search
CPC .................................................... G05B 19/042
See application file for complete search history.

(56) References Cited

U.S. PATENT DOCUMENTS

| 6,165,406 | A | 12/2000 | Jane et al. |
| 8,609,204 | B2 | 12/2013 | Kritchman et al. |

(Continued)

FOREIGN PATENT DOCUMENTS

WO    2005/005562 A2    1/2005

OTHER PUBLICATIONS

Evaggelia-Aggeliki Karabassi, Georgios Papaioannou & Theoharis Theoharis, (1999) A Fast Depth-Buffer Based Voxelization Algorithm, Journal of Graphics Tools, 4:4, 5-10.

(Continued)

*Primary Examiner* — Tuan C Dao
(74) *Attorney, Agent, or Firm* — Thomas Lizzi (57) ABSTRACT

Methods are provided for solid free-form fabrication of an article without using a slice stack file quickly and efficiently—in terms of computational resources—converting STL files representing an article or articles to be built by SFFF without the use of a conventional slicing program. An application program interface ("API") is used to generate a bitmap corresponding to each particular layer of the article that is to be printed directly from the article's STL file. This conversion may done essentially in real time immediately before the particular layer is to be printed. The bitmap is used in configuring the printing instructions for the SFFF printing mechanism to print that particular layer.

8 Claims, 9 Drawing Sheets

(51) Int. Cl.
  *B33Y 50/00* (2015.01)
  *B33Y 50/02* (2015.01)
  *B29C 64/165* (2017.01)
  *B29C 64/386* (2017.01)
(52) U.S. Cl.
  CPC ............... *B33Y 50/00* (2014.12); *B33Y 50/02* (2014.12); *G06T 19/00* (2013.01); *G05B 2219/49023* (2013.01)

(56) References Cited

U.S. PATENT DOCUMENTS

| | | | |
|---|---|---|---|
| 2004/0125103 A1* | 7/2004 | Kaufman | G06T 15/06 345/419 |
| 2007/0116311 A1 | 5/2007 | Litke et al. | |
| 2010/0168890 A1 | 7/2010 | Fisher et al. | |
| 2011/0082667 A1* | 4/2011 | Ibarz | G06T 15/503 703/1 |
| 2012/0195994 A1 | 8/2012 | El-Siblani et al. | |
| 2012/0330620 A1* | 12/2012 | Sullivan | G05B 19/4069 703/1 |
| 2013/0073068 A1 | 3/2013 | Napadensky | |
| 2014/0058959 A1* | 2/2014 | Isbjornssund | G06F 21/10 705/310 |
| 2015/0266242 A1* | 9/2015 | Comb | B29C 64/393 264/40.1 |
| 2016/0287211 A1* | 10/2016 | DaCosta | A61B 8/4416 |

OTHER PUBLICATIONS

Sang C. Park, Triangular Mesh Intersection, The Visual Computer, 2004, 20:448-456, Springer-Vertag.

Elmar Eisemann, et al., Single-Pass GPU Solid Voxelization for Real-Time Applications, Graphics Interface Conference, May 28-30, 2008, p. 73.

* cited by examiner

THREE-DIMENSIONAL PRINTING USING FAST STL FILE CONVERSION

FIELD OF THE INVENTION

The present invention relates to the field of solid free-form fabrication, which is also known as additive manufacturing. In particular, the invention relates to methods for quickly transforming a stereolithographic data file (.stl) containing a three dimensional mathematical model of the physical article that is to be produced by solid free-form fabrication into instructions to the printing mechanism for the layer-by-layer construction of the physical article.

BACKGROUND OF THE INVENTION

In recent years, solid free-form fabrication processes (also known as additive manufacturing processes) have been developed for producing a physical article directly from an electronic representation of the article. The term "solid free-form fabrication process" ("SFFF") as used herein refers to any process that results in a three-dimensional physical article and includes a step of sequentially forming the shape of the article one layer at a time from an electronic representation of the article. Solid free-form fabrication processes are also known in the art as "layered manufacturing processes." They are also sometimes referred to in the art as "rapid prototyping processes" when the layer-by-layer building process is used to produce a small number of a particular article. A solid free-form fabrication process may include one or more post-shape forming operations that enhance the physical and/or mechanical properties of the article. Examples of solid free-form fabrication processes include the three-dimensional printing ("3DP") process and the Selective Laser Sintering ("SLS") process. An example of the 3DP process may be found in U.S. Pat. No. 6,036,777 to Sachs, issued Mar. 14, 2000. An example of the SLS process may be found in U.S. Pat. No. 5,076,869 to Bourell et al., issued Dec. 31, 1991. Solid free-form fabrication processes in accordance with the present invention can be used to produce articles comprised of metal, polymeric, ceramic, composite materials, and other materials. The development of solid free-form fabrication processes has produced a quantum jump reduction in the time and costs incurred in going from concept to manufactured article by eliminating costly and time-consuming intermediate steps that were traditionally necessary.

Many solid free-form fabrication processes consist of the basic steps of: (1) applying and smoothing out a first layer of a build material, e.g., a powder, to a vertically indexable build stage; (2) scanning the build material layer with the printing mechanism to impart to it the image of the relevant two-dimensional layer of the article being built; (3) lowering the stage to receive another layer of build material; and (4) repeating steps (1) through (3) until the article is completed. The layer-by-layer construction results in the formation of the desired physical article. Subsequent processing is often employed to enhance the physical properties of the constructed physical article.

The term "printing mechanism" as used herein generically refers to the component of the solid free-form fabrication system that (1) physically imparts the image of the relevant two-dimensional layer of the article that is being constructed onto a construction material that is upon the stage upon which the article is being built, and/or (2) deposits a layer of a construction material in the image of such a two-dimensional layer upon the stage or a previous layer. For example, in the 3DP process, the printing mechanism is a print head comprising one or more print jets and associated scanning and control mechanisms that spray droplets of a binder fluid onto a powder layer to form the image of the relevant two-dimensional layer of the physical article. In the SLS process, the printing mechanism is a laser and associated scanning and control mechanisms that scan a laser beam across a powder layer to fuse powder therein together in the form of the image of the relevant two-dimensional layer of the physical article.

A physical article that is to be constructed by solid free-form fabrication is first represented electronically as a three-dimensional model. Typically, the three-dimensional model is stored in the format of a stereolithographic file or .stl file. Files in this format are referred to herein as "STL files." An STL file typically comprises of a collection of triangles which sketch out the exterior and interior surfaces of the physical article. Features such as surface normals, i.e., a short ray pointing perpendicularly out from a face of the triangle, are associated with the triangles to indicate which surface of the triangle is facing outward from the physical object. The outward facing surface is sometimes referred to as an "exterior" or "front" face and the inward facing surface is sometimes referred to as an "interior" or "back" face.

Conventionally in solid free-form fabrication, an STL file is operated upon by a program that is referred to herein as a "slicing program." A slicing program slices the model that is in STL file format along one of three mutually orthogonal axes, e.g., the Z-axis of a set of X-Y-Z axes, to create a stack of two-dimensional layers of a specified layer thickness, i.e., slices. Within each slice, the relevant portion of the model is represented by a set of two-dimensional closed polygons.

The slicing program is typically a separate program, e.g., the Magics RP program which is available from the Materialise NV, Leuven, Belgium. However, a slicing program may also be a subset of a larger program that processes the STL file or functionally similar file into instructions for a solid free-form fabrication machine to construct the physical article. In either case, application of the slicing program results in a binary file which comprises a stack of two-dimensional slices wherein each two-dimensional layer is represented by a set of two-dimensional closed polygons. Such binary files are referred to herein as "slice stack files."

Traditionally, the control software of the solid free-form fabrication machine utilizes a slice stack file to manufacture the physical article layer-by-layer. Typically, the solid free-form fabrication machine control software transforms each model layer represented in the slice stack file into a set of instructions for controlling the printing mechanism in the creation of the corresponding physical layer of the physical article. These instructions tell the printing mechanism where to cause the build material to be (1) bound together, e.g., through the application of energy from a lasing or electron beam device or through the jetting of a binder from a jet print head, and/or (2) deposited. This operation of the printing mechanism is referred to generically herein as "printing" and these instructions are referred to generically herein as the "printing instructions," irregardless of the type of printing mechanism that is actually employed.

Figure 1:
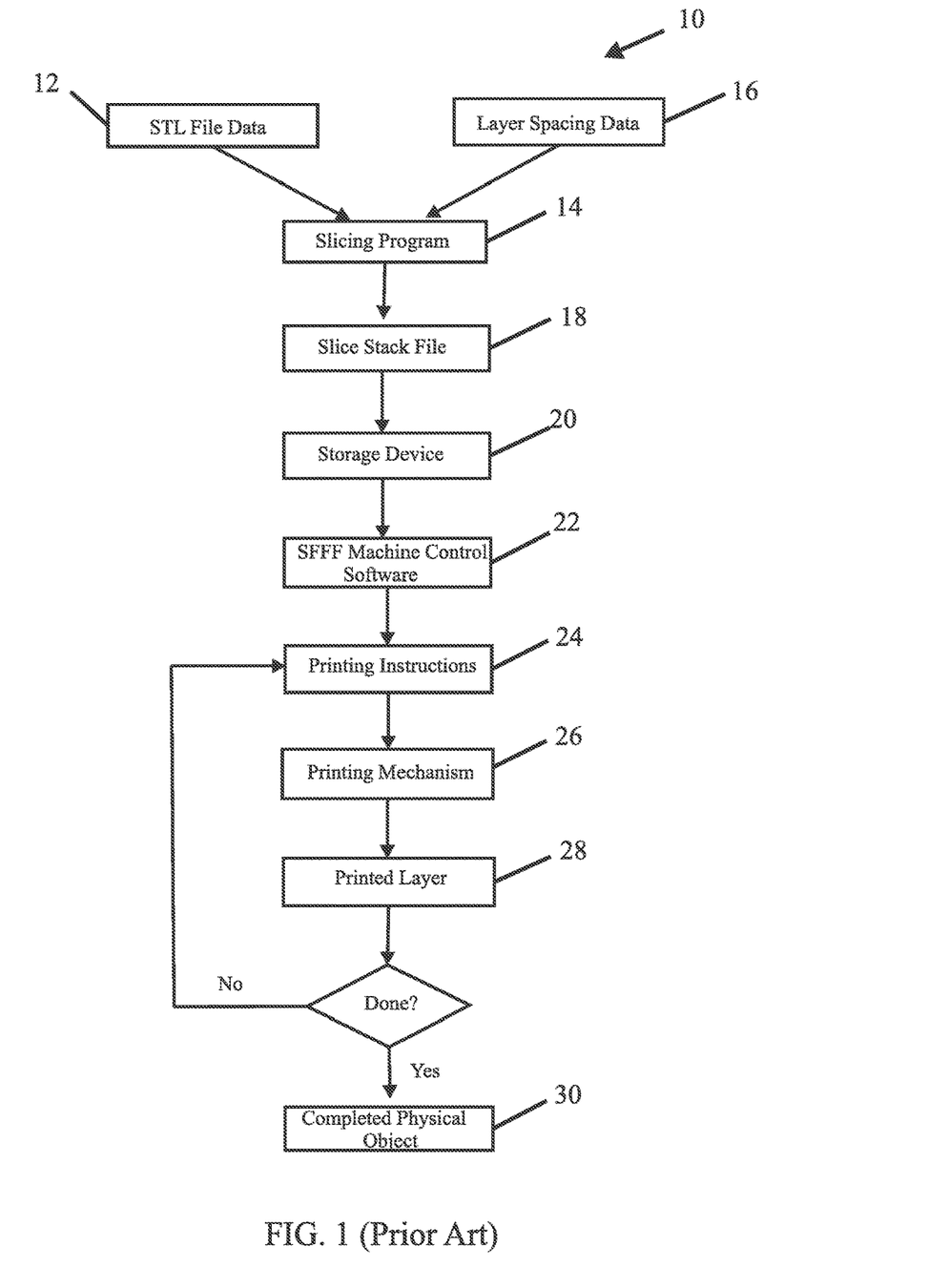
FIG. 1 is a flowchart of a prior art process for producing a physical article by solid free-form fabrication.

FIG. 1 presents a flowchart representation of a conventional process for creating a physical article by solid free-form fabrication. In exemplar conventional process 10, STL file data 12 for a model of the physical article that is to be built is input into a slicing program 14. Also input into the slicing program 14 is the selected layer spacing value 16 that is to be applied to the entire model. The slicing program 14 uses this input to create a slice stack file 18. Each planar slice is separated from the next slice by the selected layer spacing value 16. Data from the slice stack file 18 is then input into a storage device 20. Subsequently, the data from the slice stack file 18 is output from the storage device 20 into the control software 22 of a solid free-form fabrication machine. The control software 22 processes the slice stack file 18 data to create printing instructions 24 for causing the printing mechanism 26 to print each layer 28 until the completion of the physical article 30.

There are several drawbacks to the conventional method. Among these are the costs occasioned by the need to utilize a slicing program. These costs include the cost of purchasing or developing, implementing, and/or maintaining the slicing program. They also include the costs of the hardware that must be allocated to the operation and the storage of the slicing program and the resulting slice stack files. They further include the computational costs of utilizing the slicing program and then utilizing the slice stack files. Additionally, there is the cost of the time needed to utilize the slicing program to create the slice stack files.

Another drawback is the loss of detail and other information from the original three-dimensional model of the physical article. Each time a data set representing the model is transformed, some detail and information about the model is lost. Slicing programs attempt to represent the models they are operating upon in terms of particular slice planes. Thus, all information from the original model about details that exist between the slice planes is not captured by the slicing program and is therefore lost. This means the original model is not available from the slice stack file for viewing, moving, scaling, or other operations. This also means that the slice stack file can only be used by a solid free-form fabrication machine that is capable of utilizing the particular slice thickness that was selected in creating the slice stack file and which is capable of using the same printing device indexing steps and other parameters. This limits the portability of the slice stack file from one solid free-form fabrication machine to another.

A few years ago, one of the inventors of the present invention, disclosed in U.S. Patent Application Publication US 2010/0168890 A1 methods utilizing ray casting for converting STL files without the use of a slicing program into instructions to the printing mechanism for the layer-by-layer construction of the physical article. Although those methods were superior in many ways to other conventional STL conversion methods, they involved extensive computations and could result in the loss of some resolution.

SUMMARY OF THE INVENTION

The present invention overcomes at least some of the aforementioned problems associated with the prior art by providing methods for quickly and efficiently—in terms of computational resources—converting STL files representing an article or articles to be built by SFFF without the use of a conventional slicing program. The present invention accomplishes this by utilizing an application program interface ("API") to generate a bitmap corresponding to each particular layer of the article that is to be printed directly from the article's STL file. Preferably, this conversion is done essentially in real time immediately before the particular layer is to be printed, although it is also within the scope of the present invention to store the results of the conversion of one or more—or even all—of the layers for later use. Once generated, the bitmap may then be used in configuring the printing instructions for the printing mechanism to print that particular layer. In SFFF processes that use a rasterizing printing mechanism, e.g. an ink jet type print head, a scanning radiation source, or a selectively-masked radiation exposure source, the bitmap may be used to directly indicate the pixel locations that are to be printed. In SFFF processes which rely on vectorized instructions for printing, e.g. as in an SLS process, an electron-beam process, or a fused deposition process, the bitmap may be used in the creation of the vectors utilized in printing.

BRIEF DESCRIPTION OF THE DRAWINGS

The criticality of the features and merits of the present invention will be better understood by reference to the attached drawings. It is to be understood, however, that the drawings are designed for the purpose of illustration only and not as a definition of the limits of the present invention.

DESCRIPTION OF PREFERRED EMBODIMENTS

In this section, some preferred embodiments of the present invention are described in detail sufficient for one skilled in the art to practice the present invention without undue experimentation. It is to be understood, however, that the fact that a limited number of preferred embodiments are described herein does not in any way limit the scope of the present invention as set forth in the claims. It is to be understood that whenever a range of values is described herein or in the claims that the range includes the end points and every point therebetween as if each and every such point had been expressly described. Unless otherwise stated, the word "about" as used herein and in the claims is to be construed as meaning the normal measuring and/or fabrication limitations related to the value which the word "about" modifies. Unless expressly stated otherwise, the term "embodiment" is used herein to mean an embodiment of the present invention.

The volumetric portion or portions of the SFFF (solid free-form fabrication) apparatus in which the article or articles are to be made is referred to herein as the "print box", whether the SFFF apparatus is configured for batch processing or continuous processing. For the sake of production efficiency, it is common to make use of as much of the print box volume as possible in each SFFF apparatus build cycle by making multiple articles and/or multiple copies of a single article during each SFFF apparatus build cycle. In embodiments, each of the one or more articles that are to be made by a SFFF process is first represented by an STL file. The STL file contains the information necessary to describe the geometry of its corresponding article. For simplicity sake, the general process used in embodiments in which a single article is to be made is first described below.

Embodiments use an API (application program interface) to convert an STL file of an article into individual bitmaps, each of which corresponds to one of the SFFF process print layers for making the article. It is to be understood that the word "convert" and its various inflexions are used herein to mean that the STL file is used as a starting point from which the inventive process departs on its way to arriving at the individual print layer bitmaps. The STL file itself is not changed into something else by the inventive process, but is left intact for reuse.

The conversion is preferably done for each particular print layer essentially in real time immediately before the particular layer is to be printed, although it is also within the scope of the present invention to store the results of the conversion of one or more—or even all—of the layers for later use.

Figure 9:
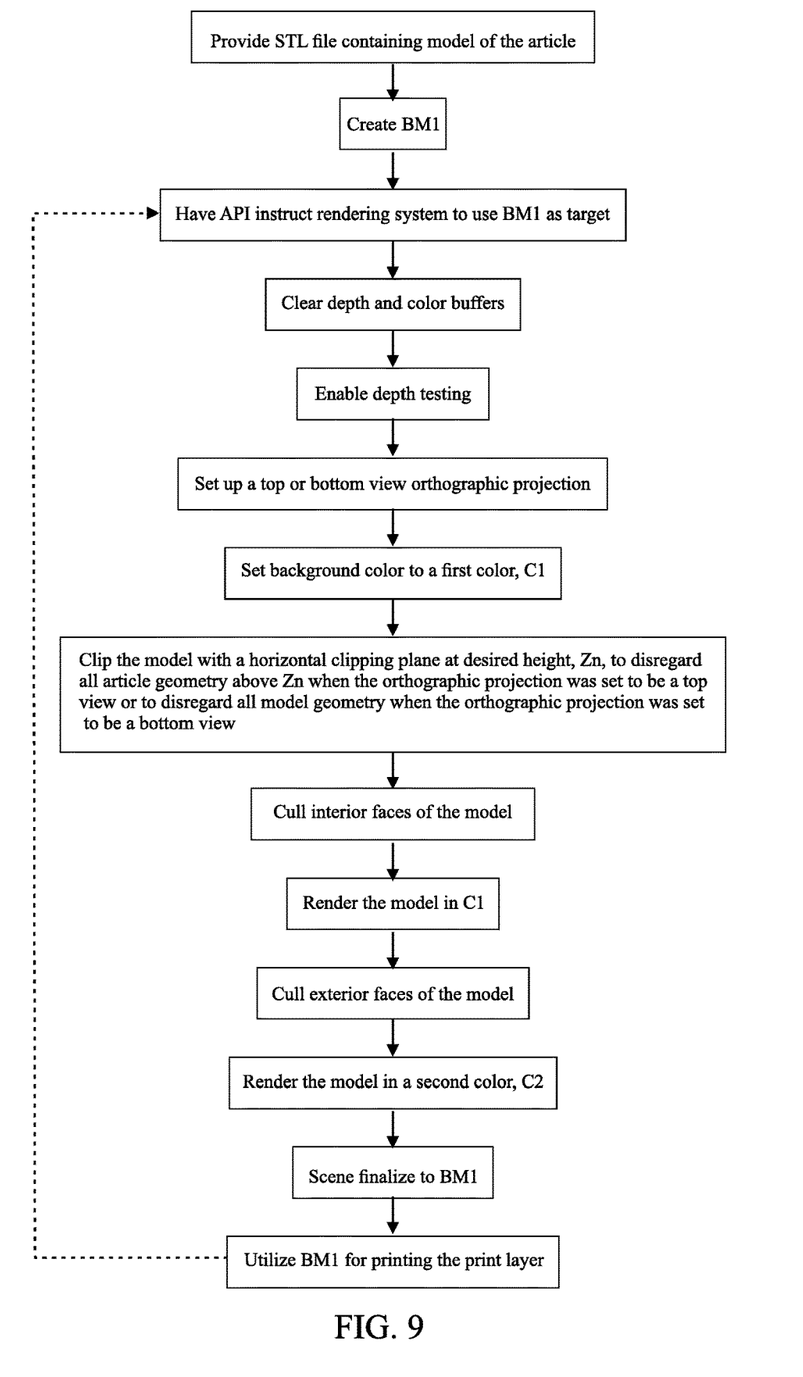
FIG. 9 is a flowchart of a process for making an article by solid free-form fabrication according to an embodiment.

As depicted by the flowchart in FIG. 9, in some embodiments, for at least one layer (and preferably all of the layers) of an article that is to be three-dimensionally printed, the API is used to do the following utilizing the STL file that contains a geometric representation, i.e., model, of the article:

1. Configure the rendering context in terms of bitsize and the number of bits that are to represent each pixel by creating a first bitmap, BM1 which is sized (a) to represent the physical size of the desired print area, and (b) according to the resolution of the printer.
2. Instruct the rendering system to use BM1 as a rendering target.
3. Instruct the rendering system to do the following:
    a) clear depth and color buffers;
    b) enable depth testing;
    c) set up a top (or bottom) view orthographic projection;
    d) set background color to a first color, C1;
    e) clip the STL file model of the article with a horizontal clipping plane at a desired height, $Z_n$, to disregard all model geometry above $Z_n$ (or to disregard all model geometry below $Z_n$ when the orthographic projection was set to be a bottom view);
    f) cull the interior (back) faces of the model;
    g) render the model in color C1;
    h) cull the exterior (front) faces of the model;
    i) render the model in a second color, C2, (which is different from C1); and
    j) scene finalize to BM1, i.e., finalize the scene to target bitmap, BM1.
4. Utilize BM1 for printing the layer.

In the step of utilizing the created bitmap for printing the layer, the bitmap is accessed to create the printing instructions for the printing mechanism of the SFFF. For example, where the printing mechanism includes an inkjet-like print head, the bitmap may be used to instruct the print head exactly where to deposit a binder fluid on the then-current surface layer of the print box or relatively where to make such deposits after any desired offsets are taken into consideration. As another example, in SFFF processes which rely on vectorized instructions for printing, e.g. as in an SLS process, an electron-beam process, or a fused deposition process, the bitmap may be used in the creation of the vectors utilized in printing.

Figure 2:
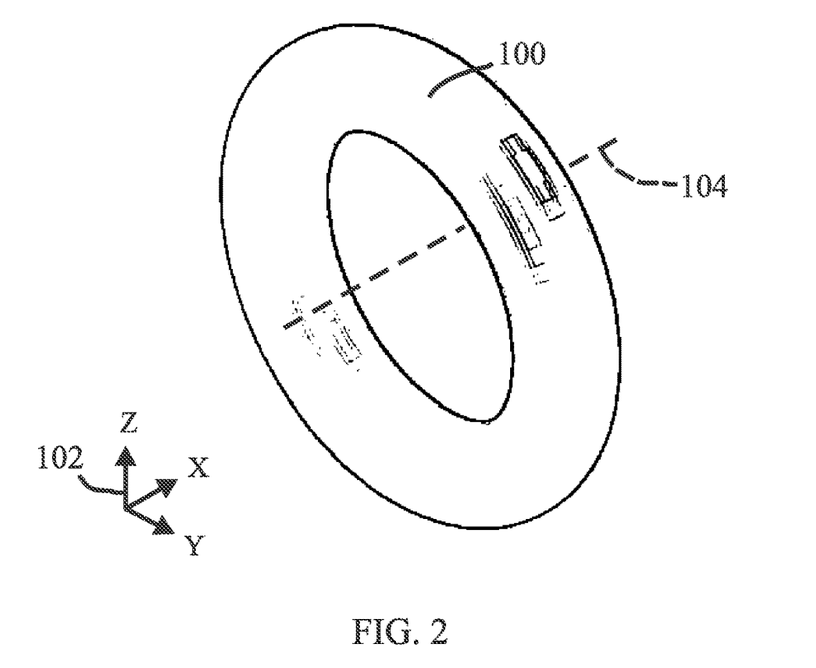
FIG. 2 is schematic perspective view of torus oriented vertically in a print box.

FIGS. 2 through 8 provide an overall depiction of the above-described process for making a single instance of solid torus, article 100, by an SFFF process. In this depiction, Step 3(c) of the process will use a top view orthographic projection. Referring to FIG. 2, the direction marker 102 shows that, for the purpose of this discussion, article 100 is oriented vertically in the print box of the SFFF apparatus with its central axis 104 parallel to the X-direction of the print box. The initial build layer for making article 100 intersects the X-Y plane of the print box. Each of the other build layers that will be used to make article 100 in the SFFF apparatus is parallel to the X-Y plane of the print box.

Figure 3:
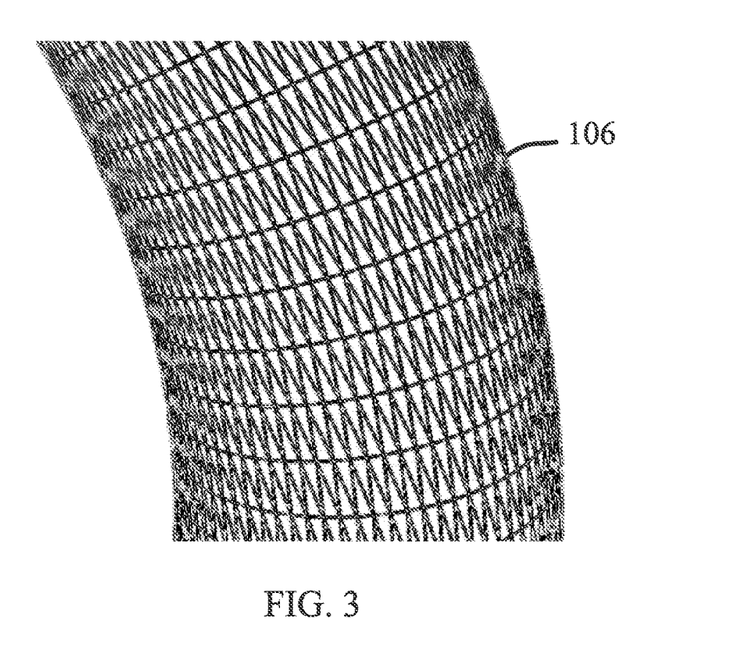
FIG. 3 is a schematic perspective view of a portion of the torus of FIG. 2 showing STL file tessellated triangles on its viewer-facing side.

FIG. 3 gives a suggestion of what a portion 106 of the article 100 would look like when it is drawn with the tessellated triangles of an STL file model by showing the tessellated triangles on the viewer-facing surface of article 100. Including the viewer-facing surface of article 100 in this depiction avoids the confusion that arises when the tessellated triangles on both the viewer-facing surface and its obverse are seen at the same time as happens in an unenhanced drawing of an STL file model.

Figure 4:
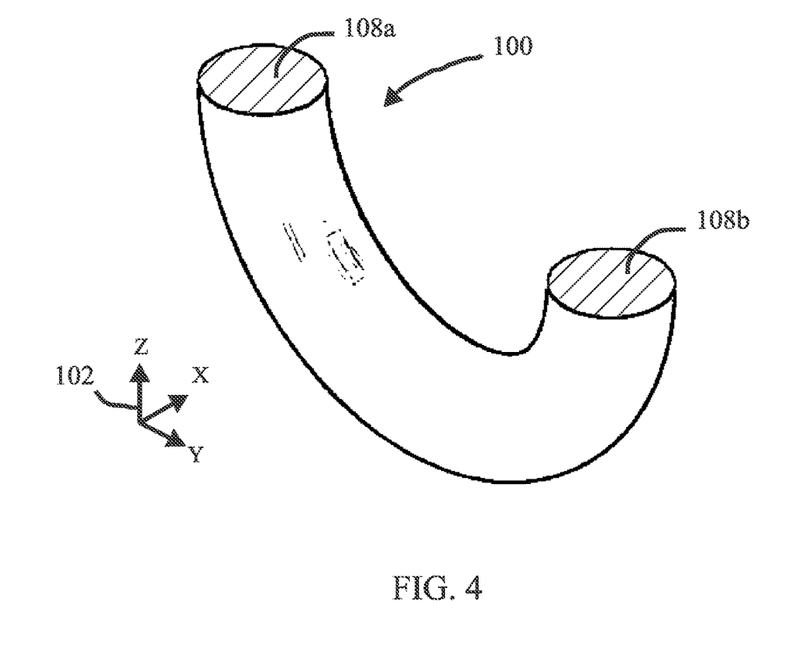
FIG. 4 is a schematic perspective view of the lower half of the torus of FIG. 1.
Figure 5:
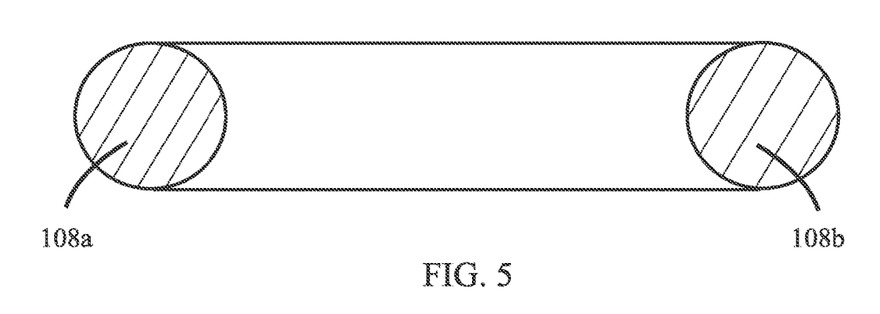
FIG. 5 is a schematic top view orthographic projection of the torus of FIG. 4.

A build layer selected at a height $Z_{0.5}$, which is halfway up the Z-axis height of article 100, will now be chosen for the sake of illustration. FIG. 4 shows a perspective view of the article 100 from its bottom up to this build layer, which is essentially what remains of the article 100 when the STL file model of the article 100 is clipped with a horizontal plane at this height, $Z_{0.5}$. At this build layer height, the article 100 has two identical cross-sectional surfaces, 108a, 108b. FIG. 5 shows the top view orthographic projection of the article 100 at this build layer height, with the two cross-sectional surfaces 108a, 108b, shown in this drawing in right-slanting hatching for clarity.

Figure 6:
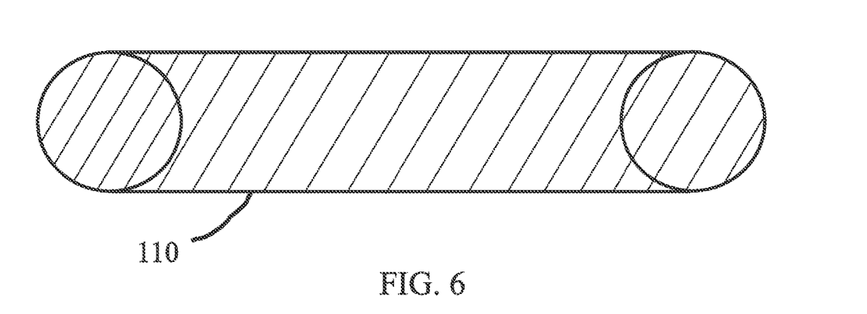
FIG. 6 is a schematic depiction of the results of rendering the projection of FIG. 5 after the culling of interior faces.

FIG. 6 shows the result, first image 110, of the rendering Step 3(g) after the culling of the interior (back) faces of the model. The right-slanting hatching is used to depict color C1.

Figure 7:
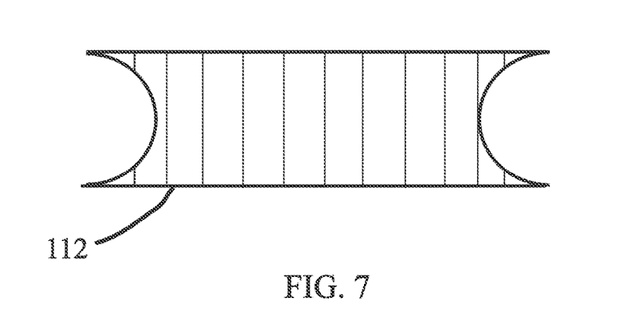
FIG. 7 is a schematic depiction of the results of rendering the projection of FIG. 5 after the culling of exterior faces.

FIG. 7 shows the result, second image 112, of the rendering Step 3(i) after the culling of the exterior (front) faces of the model. The Vertical hatching is used to depict color C2.

Figure 8:
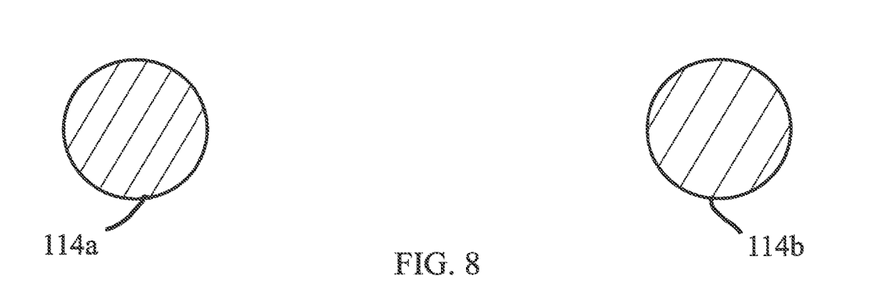
FIG. 8 is a schematic top view of a build layer after scene finalization has combined in an exclusive or fashion the depictions shown in FIGS. 6 and 7.

FIG. 8 shows the build layer as it would be represented in bitmap BM1 after the scene finalization of Step 3(j). The scene finalization effectively combines the first and second images 110, 112 in an "exclusive or" fashion. The two areas 114a, 114b, are made up of the pixels which are to be printed in the SFFF apparatus for the print layer. These two layers 114a, 114b, correspond to the two cross-sectional surfaces 108a, 108b of FIG. 5.

Figure 10:
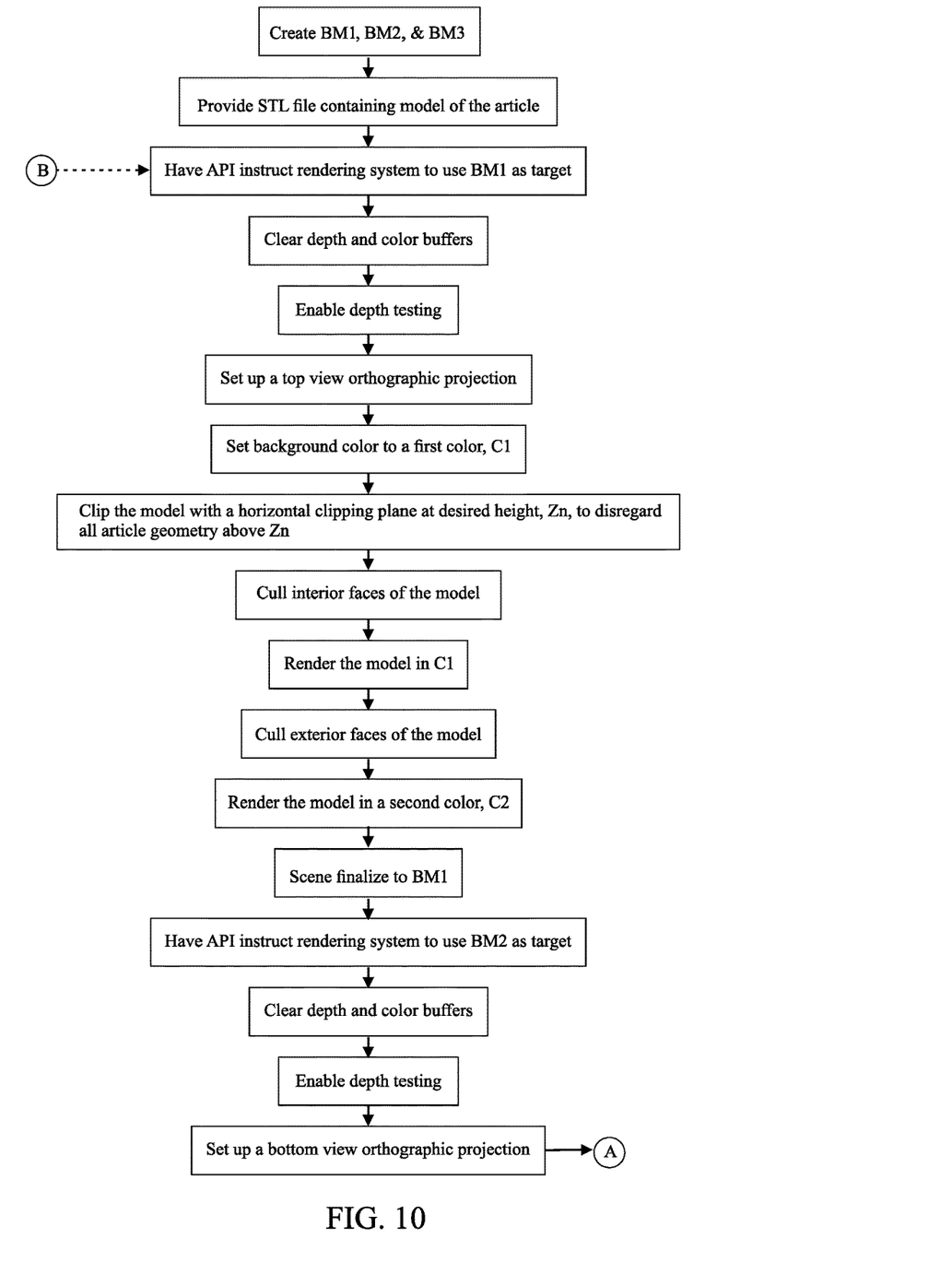
FIG. 10 is a flowchart of a process for making an article by solid free-form fabrication according to another embodiment.

In some preferred embodiments, the above-described process is modified to lessen the effect of stray or missing pixels in the bitmap which may result from floating point inaccuracies that can arise from the rendering of the STL file triangles. In these embodiments, a second bitmap, BM2, is created in addition to bitmap BM1, and then the two bitmaps are compared to create a third bitmap, BM3, which is then used for printing the layer. The bitmap BM2 is created using the opposite view orthographic projection of the STL model of the article from that was used for creating bitmap BM1 and adjusting the clipping accordingly. Thus, if BM1 is created using a top view orthographic projection and clipping which disregarded all model geometry above height $Z_n$, then BM2 is created using a bottom view orthographic projection and clipping which disregards all model geometry below height $Z_n$. A restatement of the process to include this modification is given below and depicted in the flow chart of FIG. 10 for at least one print layer of the article:

1. Configure the rendering context in terms of bitsize and the number of bits that are to represent each pixel by creating a first bitmap, BM1, a second bitmap, BM2, and a third bitmap BM3, which are sized (a) to represent the physical size of the desired print area, and (b) according to the resolution of the printer.
2. Instruct the rendering system to use BM1 as a first rendering target.
3. Instruct the rendering system to do the following:
   a) clear depth and color buffers;
   b) enable depth testing;
   c) set up a top view orthographic projection;
   d) set the background color to a first color, C1;
   e) clip the model with a horizontal clipping plane at a desired height, $Z_n$, to disregard all model geometry above $Z_n$;
   f) cull the interior (back) faces of the model;
   g) render the model in color C1;
   h) cull the exterior (front) faces of the model;
   i) render the model in a second color, C2, (which is different from C1); and
   j) scene finalize to BM1.
4. Instruct the rendering system to use BM2 as a second rendering target.
5. Instruct the rendering system to do the following:
   a) clear depth and color buffers;
   b) enable depth testing;
   c) set up a bottom view orthographic projection;
   d) set background color to C1;
   e) clip the model with a horizontal clipping plane at a desired height, $Z_n$, to disregard all model geometry below $Z_n$;
   f) cull the interior (back) faces of the model;
   g) render the model in color C1;
   h) cull the exterior (front) faces of the model;
   i) render the model in C2; and
   j) scene finalize to BM2.
6. Horizontally invert BM2.
7. Compare BM1 to BM2 on a pixel-to-pixel basis to determine if the value of BM1 pixel $(x_i, y_j)$ is the same as or different from the value of the corresponding BM2 pixel $(x_i, y_j)$, and then:
   a) when the values are the same, set the value of BM1 pixel $(x_i, y_j)$ to be the value of a corresponding pixel of BM3; or
   b) when the values are different, then the value of the BM1 pixel $(x_i, y_j)$ is compared with the values its neighboring eight pixels, i.e. pixels BM1 $(x_{i-1}, y_{j+1})$, BM1 $(x_i, y_{j+1})$, BM1 $(x_{i+1}, y_{j+1})$, BM1 $(x_{i-1}, y_j)$, BM1 $(x_{i+1}, y_j)$, BM1 $(x_{i-1}, y_{j-1})$, BM1 $(x_i, y_{j-1})$, BM1 $(x_{i+1}, y_{j-1})$, to determine the value having the majority of instances among the nine compared pixels, then the majority value is to be set to as the value of a corresponding pixel of BM3.
8. Utilize BM3 for printing the layer.

It is to be understood that Step 1 in the modified process recites creating all three bitmaps at the same time only as a convenience and each can be created at any desired time. It is also to be understood that BM1 and BM2 are to be of the same size so that they can be compared on a pixel-to-pixel basis. BM3 may be the same size as the other two bitmaps, or larger than them, for example to accommodate printing offsets.

It is also to be understood that the method of determining what value to give to a pixel in Step 7(b) may be modified to use more or less surrounding pixels for comparison. For example, the comparison can be with just the pixels which are contiguous with the tested pixel on a diagonal, a column, or a row.

It is also to be understood that the inversion of bitmap BM2 in Step 6 is performed so that the locations represented by the pixels of bitmap BM2 correlate exactly with those represented by bitmap BM1. Other means may be used to arrive at this correlation. For example, the comparison done in Step 7 can be done utilizing a non-inverted bitmap BM2 if the directions for pixel selection of bitmaps BM1 and BM2 are picked to take into account that bitmaps BM1 and BM2 are essentially mirror images of each other. As another example, the populating of bitmap BM2 (or bitmap BM1) can be done in a fashion that likewise avoids the need to perform a separate inversion step of bitmap BM2 (or bitmap BM1).

Figure 11:
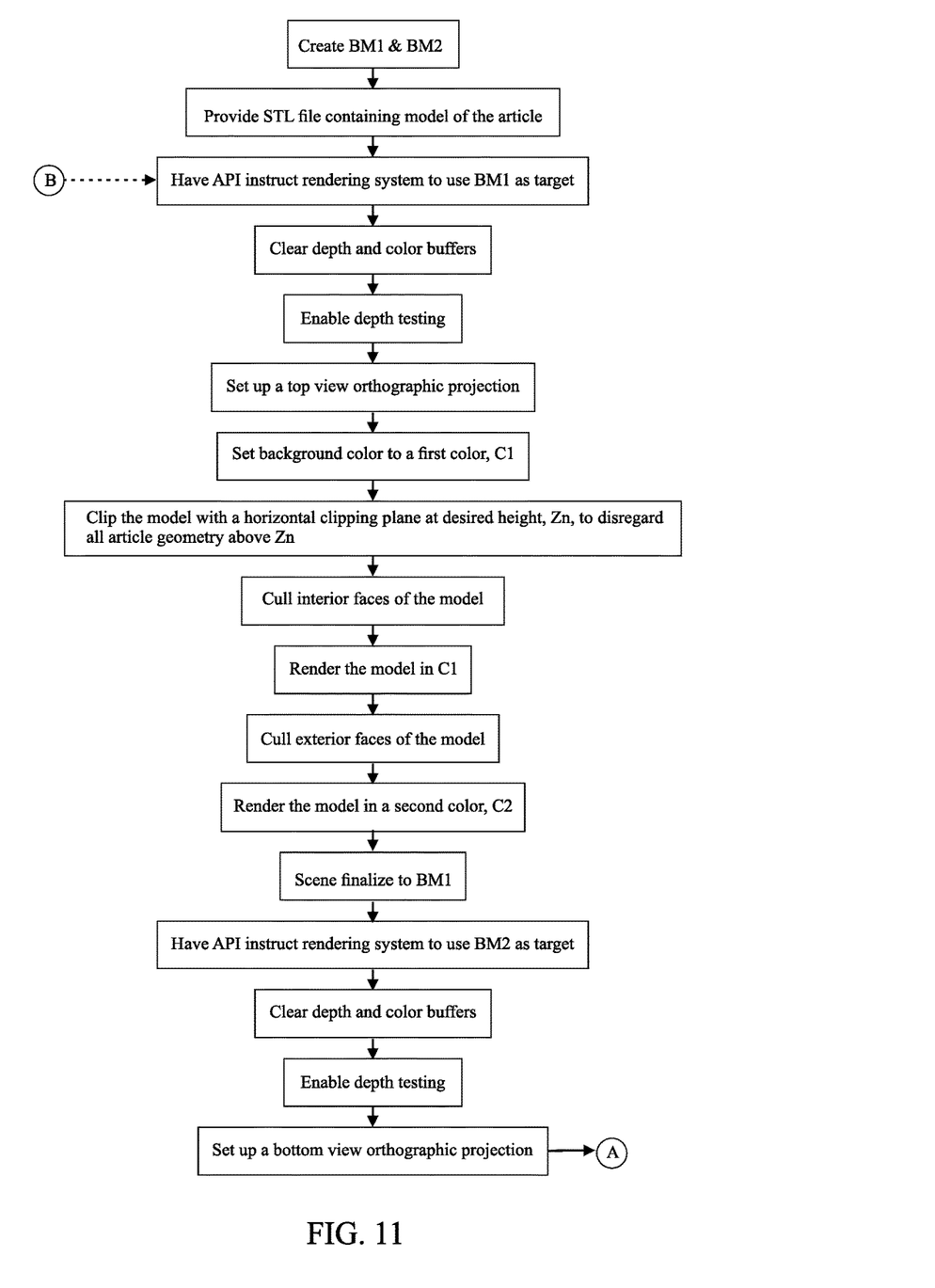
FIG. 11 is a flowchart of a process for making an article by solid free-form fabrication according to another embodiment.

It is also to be understood that, though it is preferred, it is not necessary to use a third bitmap, e.g. BM3, to store the results of the comparison of BM1 and BM2 so long as the results get stored as a bitmap. For example, either or both of BM1 and BM2 can be repopulated with the comparison results and then the bitmap or bitmaps containing the results used in place of BM3 in Step 8 above. Such an embodiment is depicted by the flow chart of FIG. 11.

The above-described inventive processes can be applied to making multiple articles and/or multiple copies of a single article during a SFFF apparatus build cycle. In the cases where geometrically different articles are to be made in the same print bed, the selected inventive process is applied to the STL file of each article and the results of the processes are combined into a single bitmap that is then used for printing the layer. The same would also be done where multiple copies of the same article are to be made in the same print bed, but they are differently oriented in the print bed and/or are located at different heights in the print bed. In the case where multiple copies of the same article are to be made, the selected inventive process need be applied only once to the STL file of the article and the results stored, then the bitmap that is to be used for printing the layer is populated with multiple copies of the stored results at desired spacings in the layer.

Embodiments may be practiced with any API which is capable of rendering three-dimensional vector graphics. Examples of such APIs include the Khronos Group's OpenGL and Microsoft's Direct3D. Note that the inventive processes can be used with ordinary computer processing hardware or in conjunction with dedicated graphics hardware for a further increase in computational speed.

It is to be understood that the inventive processes may be used in the making of one or more layers of an article in the print box of any SFFF apparatus, regardless of whether the SFFF apparatus is configured for batch processing or continuous processing.

While only a few embodiments of the present invention have been shown and described, it will be obvious to those skilled in the art that many changes and modifications may be made thereunto without departing from the spirit and scope of the invention as described in the claims. All United States patents and patent applications, all foreign patents and patent applications, and all other documents identified herein are incorporated herein by reference as if set forth in full herein to the full extent permitted under the law.

What is claimed is:

1. A process for making an article by solid free-form fabrication, the process including the steps of:
   a) providing an STL file containing a model of the article;
   b) for at least one print layer of the article, use an application programming interface to instruct a rendering system to use a first bitmap, BM1, as a target and
   i) clear depth and color buffers;
   ii) enable depth testing;
   iii) set up a top or bottom view orthographic projection;
   iv) set background color to a first color, C1;
   v) clip the model with a horizontal clipping plane at a desired height, $Z_n$, to disregard all article geometry above $Z_n$ when the orthographic projection was set to be a top view or to disregard all model geometry below $Z_n$ when the orthographic projection was set to be a bottom view;
   vi) cull interior faces of the model;
   vii) render the model in C1;
   viii) cull exterior faces of the model;
   ix) render the model in a second color, C2; and
   x) scene finalize to BM1; and
   c) utilize BM1 for printing the at least one print layer.

2. The process of claim 1, wherein Step (b) is performed for each print layer of the article.

3. The process of claim 1, further comprising the step of selecting the application programming interface to be OpenGL.

4. A process for making an article by solid free-form fabrication, the process including the steps of:
   a) providing an STL file containing a model of the article;
   b) for at least one print layer of the article, use an application programming interface to instruct a rendering system to use a first bitmap, BM1, as a target and
   i) clear depth and color buffers;
   ii) enable depth testing;
   iii) set up a top view orthographic projection;
   iv) set background color to a first color, C1;
   v) clip the model with a horizontal clipping plane at a desired height, $Z_n$, to disregard all model geometry above $Z_n$;
   vi) cull the interior faces of the model;
   vii) render the model of the model in C1;
   viii) cull the exterior faces of the model;
   ix) render the model in a second color, C2; and
   x) scene finalize to BM1;
   c) for the at least one print layer, use the application programming interface to instruct the rendering system to use a second bitmap, BM2, as a target and
   i) clear depth and color buffers;
   ii) enable depth testing;
   iii) set up a bottom view orthographic projection;
   iv) set background color to a first color, C1;
   v) clip the model with a horizontal clipping plane at $Z_n$ to disregard all model geometry below $Z_n$;
   vi) cull the interior faces of the model;
   vii) render the model in C1;
   viii) cull the exterior faces of the model;
   ix) render the model in a second color, C2; and
   x) scene finalize to BM2;
   d) compare BM1 to BM2 on a pixel-to-pixel basis;
   e) use the results of the comparison in Step (d) for printing the at least one print layer.

5. The process of claim 4, wherein Steps (b) through (e) are performed for each print layer of the article.

6. The process of claim 4, wherein the comparison in Step (d) comprises comparing BM1 to BM2 on a pixel-to-pixel basis to determine if the value of BM1 pixel $(x_i, y_j)$ is the same as or different from the value of the corresponding BM2 pixel $(x_i, y_j)$, and then:
   i) when the values are the same, select the value of BM1 pixel $(x_i, y_j)$ to be the value to be used as part of the results in Step (e); or
   ii) when the values are different, then the value of the BM1 pixel $(x_i, y_j)$ is compared with the values its neighboring eight pixels, i.e. pixels BM1 $(x_{i-1}, y_{j+1})$, BM1 $(x_i, y_{j+1})$, BM1 $(x_{i+1}, y_{j+1})$, BM1 $(x_{i-1}, y_j)$, BM1 $(x_{i+1}, y_j)$, BM1 $(x_{i-1}, y_{j-1})$, BM1 $(x_i, y_{j-1})$, BM1 $(x_{i+1}, y_{j-1})$, to determine the value having a majority of instances among the nine compared pixels, then select the majority value as the value to be used as part of the results in Step (e).

7. The process of claim 4, wherein the comparison in Step (d) are stored in a third bitmap, BM3, and Step (d) comprises comparing BM1 to BM2 on a pixel-to-pixel basis to determine if the value of BM1 pixel $(x_i, y_j)$ is the same as or different from the value of the corresponding BM2 pixel $(x_i, y_j)$, and then:
   i) when the values are the same, set the value of a corresponding BM3 pixel $(x_i, y_j)$ to be the value of the BM1 pixel $(x_i, y_j)$; or
   ii) when the values are different, then the value of the BM1 pixel $(x_i, y_j)$ is compared with the values its neighboring eight pixels, i.e. pixels BM1 $(x_{i-1}, y_{j+1})$, BM1 $(x_i, y_{j+1})$, BM1 $(x_{i+1}, y_{j+1})$, BM1 $(x_{i-1}, y_j)$, BM1 $(x_{i+1}, y_j)$, BM1 $(x_{i-1}, y_{j-1})$, BM1 $(x_i, y_{j-1})$, BM1 $(x_{i+1}, y_{j-1})$, to determine the value having a majority of instances among the nine compared pixels, then the majority value is to be set the value of a corresponding BM3 pixel $(x_i, y_j)$ to be the majority value.

8. The process of claim 4, further comprising the step of selecting the application programming interface to be OpenGL.

* * * * *